Nov. 18, 1969 DINH TUAN NGO 3,479,619

WAVE SWITCHING ARRANGEMENT

Filed Oct. 28, 1965 2 Sheets-Sheet 1

INVENTOR
D. T. NGO
BY
Kenneth B. Hamlin
ATTORNEY

United States Patent Office 3,479,619

Patented Nov. 18, 1969

3,479,619

WAVE SWITCHING ARRANGEMENT

Dinh Tuan Ngo, Somerset, N.J., assignor to Bell Telephone Laboratories, Incorporated, New York, N.Y., a corporation of New York Filed Oct. 28, 1965, Ser. No. 505,567

Int. Cl. H03j *3/16;* H03h *7/38*

U.S. Cl. 333—31 8 Claims

ABSTRACT OF THE DISCLOSURE

Anisotropic magnetic film coating on one conductor of a two-conductor wave propagating structure has its hard axis oriented parallel to the magnetic field component of the wave to produce attenuation of a wave having a frequency corresponding to the frequency of ferromagnetic resonance of the film. Application of an external magnetic field parallel to the hard axis rotates film magnetization toward that axis and reduces the wave attenuation. A direct current on the coated conductor provides the external field required when the easy axis is parallel to the direction of wave propagation.

This invention relations to electromagnetic wave processing circuits and, more specifically, to an electronically controlled switching organization for selectively propagating such waves.

A plurality of wave transmitting structures, such as coaxial cables, waveguides, strip lines and the like, are employed in high frequency systems to propagate wave energy. To effect various desired circuit operations in the high frequency spectrum of interest, prior art transmission structures have been loaded with ferromagnetic and/or dielectric materials to employ the bulk properties of these compositions. In addition, an external magnetic field has been utilized to bias the ferromagnetic material included in such a structure to a particular value of permeability.

In particular, prior art electromagnetic switching organizations have heretofore selectively biased a ferrite material to ferroresonate at the frequency characterizing an incident wave. Accordingly, the switch respectively resides in an open or closed state, resulting in selective wave energy propagation, when the external circuitry biases the magnetic material to a relatively high or a relatively low valued point on its associated ferroresonance absorption characteristic.

However, the switching speeds attained by such prior art structures are limited, since a switch-activating biasing current must be varied through an appreciable range in a multiturn biasing winding which includes considerable inductance.

It is therefore an object of the present invention to provide an improved electromagnetic wave switching arrangement.

More specifically, an object of the present invention is the provision of a wave switching arrangement which is relatively fast, and which changes state responsive to a relatively small control signal.

It is another object of the present invention to provide a wave switching organization which may be relatively simply and inexpensively constructed, and which is highly reliable.

These and other objects of the present invention are realized in a specific, illustrative electronically controlled switching organization for selectively passing a flow of electromagnetic wave energy. The arrangement comprises a wave transmission structure having a center conductor loaded with a ferromagnetic thin film characterized by a circumferential hard magnetization axis, and an easy axis parallel to the direction of wave propagation. In addition, a switched current source is employed to selectively energize the center conductor.

When no current is supplied by the current source, the film absorbs waves exhibiting the film ferroresonant frequency, thus inhibiting transmission. The switch is turned "on" when the current source energizes the center conductor, thereby driving the film magnetization to a hard axis orientation such that wave absorption is eliminated.

It is thus a feature of the present invention that an electromagnetic wave switching arrangement comprise a wave propagating structure which includes first and second conductors, ferromagnetic thin film disposed about the first conductor, with the film being characterized by easy and hard axes of magnetization respectively oriented parallel to, and circumferentially around the first conductor, and control circuitry for selectively impressing a direct-current current on the first conductor.

It is another feature of the present invention that a wave switching organization comprise a wave propagating structure, an anisotropic ferromagnetic thin film loading the structure, where the film includes an easy axis of magnetization parallel to the direction of wave propagation and a hard axis of magnetization parallel to the magnetic field component of waves which propagate through the structure.

A complete understanding of the present invention and of the above and other features, advantages and variations thereof may be gained from a consideration of the following detailed description of an illustrative embodiment thereof presented hereinbelow in conjunction with the accompanying drawing, in which.

Figures 1, 1A:
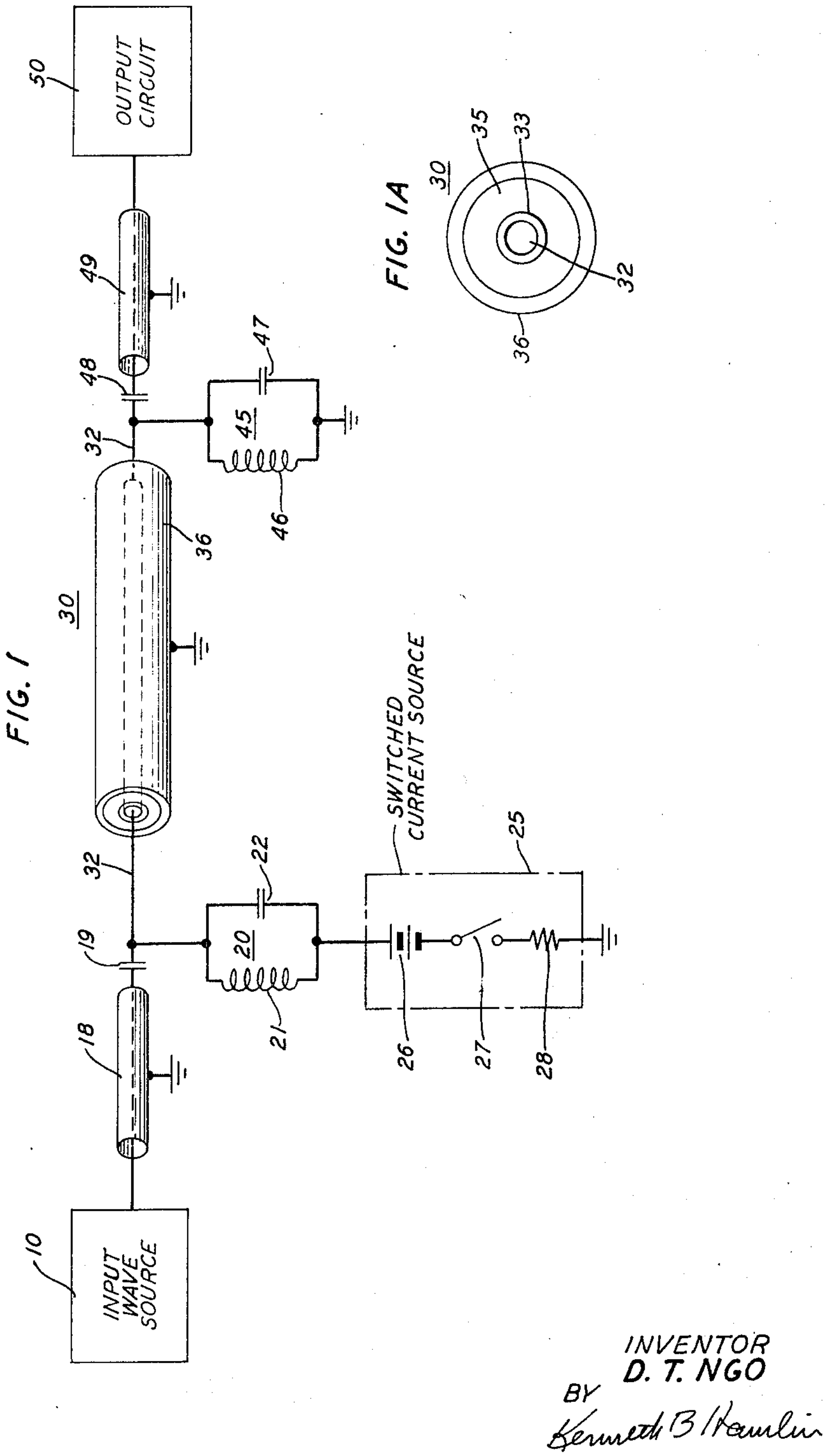
FIG. 1 is a schematic diagram of an illustrative electromagnetic wave switching arrangement made in accordance with the principles of the present invention.
FIG. 1A is a cross-sectional diagram of a wave switching structure 30 included in FIG. 1.

Referring now to FIG. 1, there is shown a specific illustrative electrically controlled switching organization for regulating the flow of wave energy between an input wave source 10 and an output circuit 50. The arrangement comprises a coaxial cable 30 having a grounded outer conductor 36, and a center conductor 32 which is connected at its extremities to the source 10 by a capacitor 19 and a coaxial cable 18, and to the output circuit 50 via a capacitor 48 and a coaxial cable 49.

In addition, the signal receiving terminal of the cable center conductor 32 is connected to a parallel resonant circuit 20, comprising an inductor 21 and a capacitor 22, which is further serially joined with a switched current source 25. The source 25 includes a potential source 26, a resistor 28, and a switch 27 which may be embodied by either a mechanical or electronic selective conducting device. Correspondingly, the output terminal of the cable center conductor 32 is connected to ground by a parallel resonant circuit 45 which consists of an inductor 46 and a capacitor 47.

Disposed about the center conductor 32 in the coaxial switch 30 is an anisotropic ferromagnetic thin film 33 which has an easy axis of magnetization parallel to the conductor 32 and a hard magnetization axis oriented circumferentially around conductor 32. Finally, the cable 30 includes a dielectric material 35 between the film 33 and the grounded outer conductor 36. The particular organization of the coaxial cable 30 is illustrated in cross-sectional form in FIG. 1A.

Figure 3:
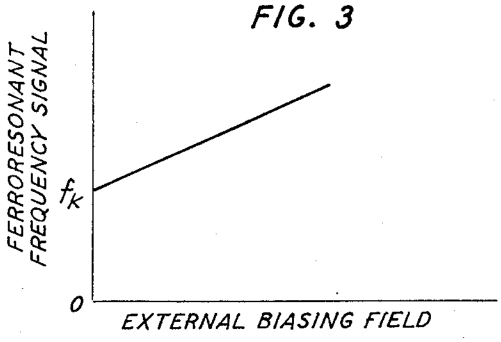
FIG. 3 is a graph depicting the relationship between the ferroresonant frequency exhibited by ferromagnetic thin film 33 included in the FIG. 1 organization and an applied external magnetizing field.

The ferromagnetic thin film 33 is disposed to ferroresonate at a frequency which depends upon the externally applied magnetic field. The particular relationship between this ferroresonant frequency (squared) and the applied field is shown in FIG. 3. When no external field is applied, the film 33 ferroresonates at a frequency $f_k$ shown in FIG. 3, where $f_k$ is a bulk property of the film which may be varied by changing its composition, relative thickness, or magnetostrictive characteristic. Correspondingly, the source 10 is adapted to supply waves of a nominal frequency $f_k$, and the parallel resonant circuits 20 and 45 are tuned to $f_k$.

Figure 4:
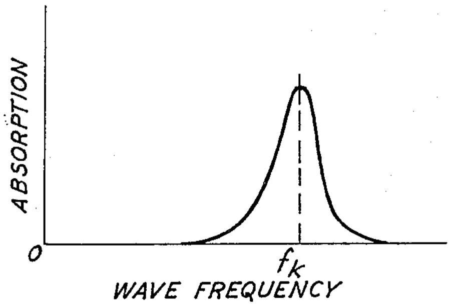
FIG. 4 is a graph depicting the absorption characteristic for the film 33 shown in FIG. 1.

When the magnetic field component of an electromagnetic wave is present in the film 33 is a direction orthogonal to the film magnetization, the magnetization precesses about its quiescent orientation and wave energy is absorbed by the film in accordance with the film absorption characteristic shown in FIG. 4. It is observed that maximum absorption occurs for waves exhibiting the film ferroresonant frequency $f_k$. Moreover, the aforementioned orthogonal relationship gives rise to an iterative impedance for the cable 30 which causes wave reflections. Hence, by reason of both the above processes, wave energy is inhibited from translating through the coaxial cable 30 to the output circuit 50.

Conversely, when the magnetic field wave component and the film 33 magnetization state are parallel, there is no coupling between the film and the wave. Accordingly, with this relationship obtaining, the wave propagates through the cable 30 essentially unattenuated.

With the above general considerations in mind, circuit functioning for the FIG. 1 wave switching arrangement will now be considered. When the switch 27 resides in a closed state, a direct current, essentially given by the quotient of the voltage supplied by the source 26 divided by the resistance value characterizing the element 28, flows through the cable 30 center conductor 32 via a path which also includes the resonant circuit inductors 21 and 46. This current is blocked by the capacitors 19 and 48 from flowing towards either the input source 10 or the output circuit 50.

While the control current persists in the center conductor 32, it generates a magnetic field which drives the magnetization of the film 33 from a quiescent easy axis orientation to a hard axis direction circumferentially around the conductor 32. This magnetization state for the film 33 is indicated by the vector M in FIG. 2A.

Figure 2A:
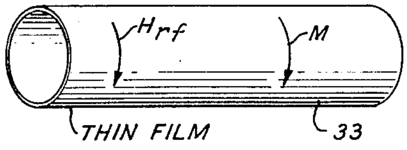
FIGS. 2A and 2B are diagrams depicting the relative orientation of selected magnetic parameters characterizing the FIG. 1 arrangement.

When the source 10 now supplies a wave to the cable 30 via the cable 18 and the capacitor 19, the wave is established in the cable 30 with a radial electric field and a magnetic field oriented circumferentially around the center conductor 32. This magnetic field is indicated in FIG. 2A by the vector $H_{rf}$. Since the magnetic field component of the wave is parallel to the magnetization of the film, there is no coupling or interaction therebetween, as discussed hereinabove. Accordingly, the wave will not be attenuated by the cable 30, and will propagate from the source 10 to the output circuit 50. This comprises the "on" state for the composite FIG. 1 wave switching arrangement.

It is noted that the parallel resonant circuits 20 and 45 exhibit very large impedances at the wave frequency $f_k$ which corresponds to resonance for the circuits 20 and 45. Accordingly, very little wave energy is deviated from the output circuit 50 to ground through these configurations.

At this point, let the switch 27 reside in an open state. With this circuit condition prevailing, no direct-current current flows in the cable 30 center conductor 32. Accordingly, the magnetization of the film 33 is characterized by its quiescent easy axis orientation, as illustrated in FIG. 2B by the vector M.

Figure 2B:
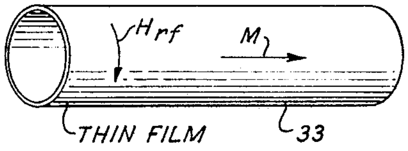

When an electromagnetic wave is now supplied by the source 10 to the cable 30, the magnetic field component thereof is again disposed circumferentially around the cable center conductor 32, as represented by the vector $H_{rf}$ in FIG. 2B. The magnetic field component of the wave is thus orthogonal to the magnetization of the film, and there is maximum coupling or interaction between the film and the wave. In particular, as heretofore discussed, the wave causes the magnetization of the film to precess about the quiescent easy axis orientation, resulting in absorption and reflection of wave energy by the film. Hence, the wave is inhibited from reaching the output circuit 50. This comprises the "off" position for the composite FIG. 1 wave switching organization.

Thus, the FIG. 1 switching circuitry has been shown by the above to respectively pass or block wave energy supplied by the source 10 when the switched current source 25 is, or is not, supplying a current to the cable 30 center conductor 32. In quantitative terms, a six inch cable 30 has been employed to generate greater than 30 db of attenuation (switch "off") with an insertion loss of less than 3 db (switch "on"). Moreover, a switched control current of less than one ampere is required.

It is noted at this point that the switch controlling direct-current current may be established or terminated in the center conductor 32 in a relatively short time interval, since the conductor 32 comprises just a single turn of wire, and is therefore characterized by a relatively small inductance. Hence, the FIG. 1 organization may translate between its "on" and "off" states in a correspondingly relatively short time interval.

In addition, it is observed that an energized external winding may be coupled to the coaxial cable 30, and thereby also to the film 33 included therein, to change the operative wave switching frequency in accordance with the relationship shown in FIG. 3.

It is to be understood that the above-described arrangement is only illustrative of the application of the principles of the present invention. Numerous other arrangements may be devised by those skilled in the art without departing from the spirit and scope thereof. For example, the resonant circuits 20 and 45 shown in FIG. 1 may be replaced by quarter wave transmission line transformers, monitor T's, or the like.

What is claimed is:

1. In combination, means for propagating an electromagnetic wave exhibiting a predetermined frequency, said propagating means including first and second conductors, and a ferromagnetic thin film disposed about said first conductor, said film being ferroresonant at said frequency for producing at said ferroresonant frequency maximum absorption of said wave with an external magnetic bias field of zero and being respectively characterized by easy and hard axes of magnetization respectively oriented parallel to and circumferentially around said first conductor.

2. A combination as in claim 1 further comprising means connected to said first conductor for selectively impressing a direct current thereon.

3. A combination as in claim 2 further comprising a wave supplying source connected to a first end of said first conductor.

4. A combination as in claim 3 further comprising output utilization means connected to a second end of said first conductor.

5. A combination as in claim 4 wherein said selective current impressing means comprises a series circuit connecting said first and second ends of said first conductor, where said series circuit includes resonant circuit means resonant at said frequency, a current source, and switch means.

6. In combination, means for propagating an electromagnetic wave characterized by a magnetic field wave component axis, and an anisotropic ferromagnetic thin film loading said wave propagating means, said thin film exhibiting ferroresonance at a frequency of said wave for producing at said ferroresonance frequency maximum absorption of said wave with an external magnetic bias field of zero and being characterized by easy and hard axes of magnetization, wherein said thin film is oriented relative to said wave propagating means such that said easy axis is orthogonal to said magnetic field axis of said propagating means, and said hard axis is parallel to said magnetic field axis.

7. A combination as in claim 6 further comprising means coupled to said thin film for selectively supplying thereto a magnetic field oriented parallel to the hard magnetization axis of said thin film.

8. The combination as in claim 6 in which said propagating means is a coaxial conductor structure wherein said film is deposited on an inner conductor, a coaxial outer conductor surrounds said inner conductor, and dielectric material is substantially uniformly disposed between said conductors and coaxially therewith.

References Cited

UNITED STATES PATENTS

| | | | |
|---|---|---|---|
| 3,320,554 | 5/1967 | Wieder | 333—24.1 |
| 3,317,863 | 5/1967 | Ngo | 333—24.2 |
| 3,257,629 | 6/1966 | Kornreich | 333—31 |
| 2,911,598 | 11/1959 | Clemenson | 333—29 |
| 2,838,735 | 6/1958 | Davis | 333—31 |
| 3,243,734 | 3/1966 | Bartik | 333—20 |

HERMAN KARL SAALBACH, Primary Examiner

C. BARAFF, Assistant Examiner

U.S. Cl. X.R.

333—24.2, 73